(12) United States Patent
Alperovich et al.

(10) Patent No.: US 7,218,952 B1
(45) Date of Patent: May 15, 2007

(54) METHOD, SYSTEM AND APPARATUS IN A TELECOMMUNICATIONS NETWORK FOR SELECTIVELY TRANSMITTING INFORMATION UTILIZING THE INTERNET

(75) Inventors: Vladimir Alperovich, Dallas, TX (US); Eric Valentine, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/121,030

(22) Filed: Jul. 22, 1998

(51) Int. Cl.
 *H04B 7/22* (2006.01)
(52) U.S. Cl. .............................. 455/552.1; 455/414.1; 455/466; 370/329
(58) Field of Classification Search ............... 455/433, 455/466, 560, 556, 557, 417, 422, 445, 414; 370/389; 379/211
See application file for complete search history.

(56) References Cited

U.S. PATENT DOCUMENTS

| | | | | |
|---|---|---|---|---|
| 5,353,331 A | * | 10/1994 | Emery et al. ................ | 455/426 |
| 5,594,779 A | * | 1/1997 | Goodman ................... | 455/4.2 |
| 5,633,865 A | * | 5/1997 | Short ......................... | 370/412 |
| 5,742,668 A | * | 4/1998 | Pepe et al. .................. | 455/415 |
| 5,742,905 A | * | 4/1998 | Pepe et al. .................. | 455/461 |
| 5,745,551 A | * | 4/1998 | Strauch et al. .............. | 455/413 |
| 5,805,587 A | * | 9/1998 | Norris et al. ................ | 370/352 |
| 5,999,611 A | * | 12/1999 | Tatchell et al. ............. | 379/211 |
| 6,058,303 A | * | 5/2000 | Astrom et al. .............. | 455/413 |
| 6,078,804 A | * | 6/2000 | Alperovich et al. ........ | 455/404 |
| 6,122,263 A | * | 9/2000 | Dahlin et al. ............... | 370/329 |
| 6,125,113 A | * | 9/2000 | Farris et al. ................ | 370/389 |
| 6,125,126 A | * | 9/2000 | Hallenstal ................... | 370/522 |
| 6,134,590 A | * | 10/2000 | Perlman ...................... | 709/228 |
| 6,144,671 A | * | 11/2000 | Perinpanathan et al. .... | 370/409 |
| 6,178,331 B1 | * | 1/2001 | Holmes et al. ............. | 455/466 |
| 6,690,663 B1 | * | 2/2004 | Culver ........................ | 370/352 |
| 6,876,653 B2 | * | 4/2005 | Ambe et al. ................ | 370/389 |
| 6,931,001 B2 | * | 8/2005 | Deng .......................... | 370/352 |
| 7,072,335 B1 | * | 7/2006 | Kadambi et al. ........... | 370/389 |

\* cited by examiner

*Primary Examiner*—Temica Beamer
*Assistant Examiner*—Joy Contee
(74) *Attorney, Agent, or Firm*—Roger S. Burleigh

(57) ABSTRACT

A method, system and apparatus in a wireless communications system selectively utilizes the Internet for the transmission of information. In a first embodiment, a subscriber can activate an Internet call forwarding (ICF) supplementary service (SS). From the subscriber's Mobile Station, an ICF message is transmitted to and stored in the subscriber's Home Location Register (HLR). The ICF message may optionally designate an Internet protocol (IP) address destination and may optionally activate other features pursuant to the data type received. For example, the ICF message may request that only fax/data calls or only calls that would otherwise incur a long distance charge be forwarded over/through the Internet. In operation, an incoming call to a Gateway Mobile Services Switching Center (GMSC) causes the GMSC to interrogate the called party's HLR. The information in the incoming call is then forwarded either over/through the Internet or over the PSTN based on the features activated by the ICF message. In another embodiment, conventional telecommunication signaling commands such as the Initial Address Message may be transmitted to the target telecommunications node over the Internet.

27 Claims, 6 Drawing Sheets

METHOD, SYSTEM AND APPARATUS IN A TELECOMMUNICATIONS NETWORK FOR SELECTIVELY TRANSMITTING INFORMATION UTILIZING THE INTERNET

BACKGROUND OF THE INVENTION

1. Technical Field of the Invention

The present invention relates in general to the field of wireless telecommunications, and in particular, to a method and system for enabling a subscriber to selectively forward information over or through the Internet.

2. Description of Related Art

Mobile wireless communication is becoming increasingly important for providing safety, convenience, improved productivity, and simple conversational pleasure. One prominent mobile wireless communication option is cellular communication. Cellular phones, for instance, can be found in cars, briefcases, purses, and even pockets. For cellular phone system providers to offer cellular phone users new services, cellular wireless networks must be upgraded.

Referring now to FIG. 1 of the drawings, an exemplary cellular wireless network, such as a Global System for Mobile Communication (GSM) Public Land Mobile Network (PLMN) 100, will be described. The PLMN 100 is composed of a plurality of areas 105, each with a Mobile Services Switching Center (MSC) 110 and an integrated Visitor Location Register (VLR) 115 therein. The MSC/VLR areas 105, in turn, include a plurality of Location Areas (LA) 120, which are defined as that part of a given MSC/VLR area 105 in which a Mobile Station (MS) (terminal) 125 may move freely without having to send update location information to the MSC/VLR area 105 that controls the LA 120. Each LA 120 is divided into a number of cells 130. The MS 125 is the physical equipment, e.g., a car phone or other portable phone, used by mobile subscribers to communicate with the cellular network 100, each other, and users outside the subscribed network, both wireline and wireless.

The MSC 110 is in communication with at least one Base Station Controller (BSC) 135, which, in turn, is in contact with at least one Base Transceiver Station (BTS) 140. The BTS 140 is the physical equipment, illustrated for simplicity as a radio tower, that provides radio coverage to the geographical part of the cell 130 for which it is responsible. It should be understood that the BSC 135 may be connected to several base transceiver stations 140, and may be implemented as a stand-alone node or integrated with the MSC 110. In either event, the BSC 135 and the BTS 140 components, as a whole, are generally referred to as a Base Station System (BSS) 145.

With further reference to FIG. 1, the PLMN Service Area or wireless network 100 includes a Home Location Register (HLR) 150, which is a database maintaining all subscriber information, e.g., user profiles, current location information, International Mobile Subscriber Identity (IMSI) numbers, and other administrative information. The HLR 150 may be co-located with a given MSC 110, integrated with the MSC 110, or alternatively can service multiple MSCs 110, the latter of which is illustrated in FIG. 1.

The VLR 115 is a database containing information about all of the Mobile Stations 125 currently located within the MSC/VLR area 105. If a MS 125 roams into a new MSC/VLR area 105, the VLR 115 connected to that MSC 110 will request data about that MS 125 from the HLR database 150 (simultaneously informing the HLR 150 about the current location of the MS 125). Accordingly, if the user of the MS 125 then wants to make a call, the local VLR 115 will have the requisite identification information without having to reinterrogate the HLR 150. In the aforedescribed manner, the VLR and HLR databases 115 and 150, respectively, contain various subscriber information associated with a given MS 125.

Increasingly, mobile service subscribers are using their MS 125 as much as, or even more than, a traditional wireline phone. As a result, mobile service subscribers value options that lower the cost of their wireless service subscription or the per-minute charges thereof. Consequently, it is desirable to be able to lower the cost of service.

Additionally, wireless service subscribers are demanding value-added features from their wireless communication systems providers. Examples of such services are caller identification (ID), voice mail, and standard call forwarding. Existing wireless communication systems do not, however, offer their subscribers the ability to forward information over the Internet to an Internet address. Such existing wireless communication systems likewise do not offer their subscribers the ability to forward information through the Internet.

Because information transmission costs over the packet-switched Internet are substantially cheaper than transmission over the traditional circuit-switched telephone network, wireless service costs can be reduced by permitting a subscriber to optionally forward information over/through the Internet. Additionally, an option to forward information over the Internet would permit a subscriber to have data or other information transmitted directly to an Internet protocol (IP) address. In short, existing wireless communication systems have heretofore failed to provide the ability for a subscriber to choose to have information forwarded through the Internet (before returning to the wireless communication network) or over the Internet to an IP address.

SUMMARY OF THE INVENTION

The present invention addresses the above (and other) deficiencies in the prior art by achieving the following (and other) objects of the invention:

An object of the invention is to provide a method and system that permits information contained in incoming calls to be selectively forwarded over/through the Internet.

Another object of the invention is to provide a method and system that enables a subscriber to request that only certain types of incoming calls be forwarded over/through the Internet.

A further object of the invention is to implement a method and system that enables a subscriber to request that only long distance calls be forwarded over/through the Internet.

Yet another object of the invention is to implement a method and system that can forward information from incoming calls directly to a designated Internet protocol (IP) address destination.

A still further object of the invention is to implement a method and system whereby telecommunication signaling is effectuated over the Internet.

These objects are achieved with a method and system for a wireless communications system in which incoming calls for a wireless services subscriber are selectively forwarded over/through the Internet based, at least in part, on a profile established by the subscriber. Such a wireless telecommunications system preferably includes Mobile Stations and corresponding subscribers, Visiting Mobile Services Switching Centers (VMSCs), Home Location Registers (HLRs), and Gateway Mobile Services Switching Centers (GMSCs). The present invention is also operable in conjunction with the Internet or other packet switched network for the selective transmission of information contained in incoming calls.

In a first embodiment, a subscriber may activate an Internet call forwarding (ICF) supplementary service (SS). The subscriber activates the ICF SS from, for example, the corresponding MS. An ICF message is transmitted from the corresponding MS to a base station system and an associated Mobile Services Switching Center (MSC). The MSC sends the ICF message to the HLR of the subscriber and corresponding MS. The HLR thereafter establishes an ICF profile that includes an indication that the ICF SS is activated and that may further include at least one indication of whether any special feature(s) are currently in effect.

Special features can include instructions to forward over/ through the Internet only certain types of incoming calls, such as fax and data calls. They can include instructions to only forward over/through the Internet calls that would otherwise result in the assessment of long distance charges. They can also include instructions to forward all or some types of calls directly over the Internet to an Internet protocol (IP) address destination. When this feature is being activated, the ICF message may optionally include a designated IP address destination. It should be understood that other features may also be included.

When a GMSC receives notification of an incoming call, the GMSC interrogates the HLR corresponding to the called party to determine whether an ICF SS is activated. If so, then a comparison between the incoming call and the ICF profile is executed to determine whether Internet transmission is appropriate. The results of the determination are then effectuated. This ICF SS therefore provides an additional value-added service and reduces the costs of telecommunications by transmitting information over/through a packet-switched network instead of a circuit-switched network.

In a second embodiment, both conventional and novel telecommunications signaling are executed over the Internet. For example, the transmission of the ICF message from the VMSC to the HLR may be accomplished over the Internet in lieu of a Signaling System No. 7 (SS7) network.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE PRESENTLY PREFERRED EXEMPLARY EMBODIMENTS

In the following description, for purposes of explanation and not limitation, specific details are set forth, such as particular circuits, circuit components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

A preferred embodiment of the present invention and its advantages are best understood by referring to FIGS. 1–6 of the drawings, like numerals being used for like and corresponding parts of the various drawings.

Figure 2:
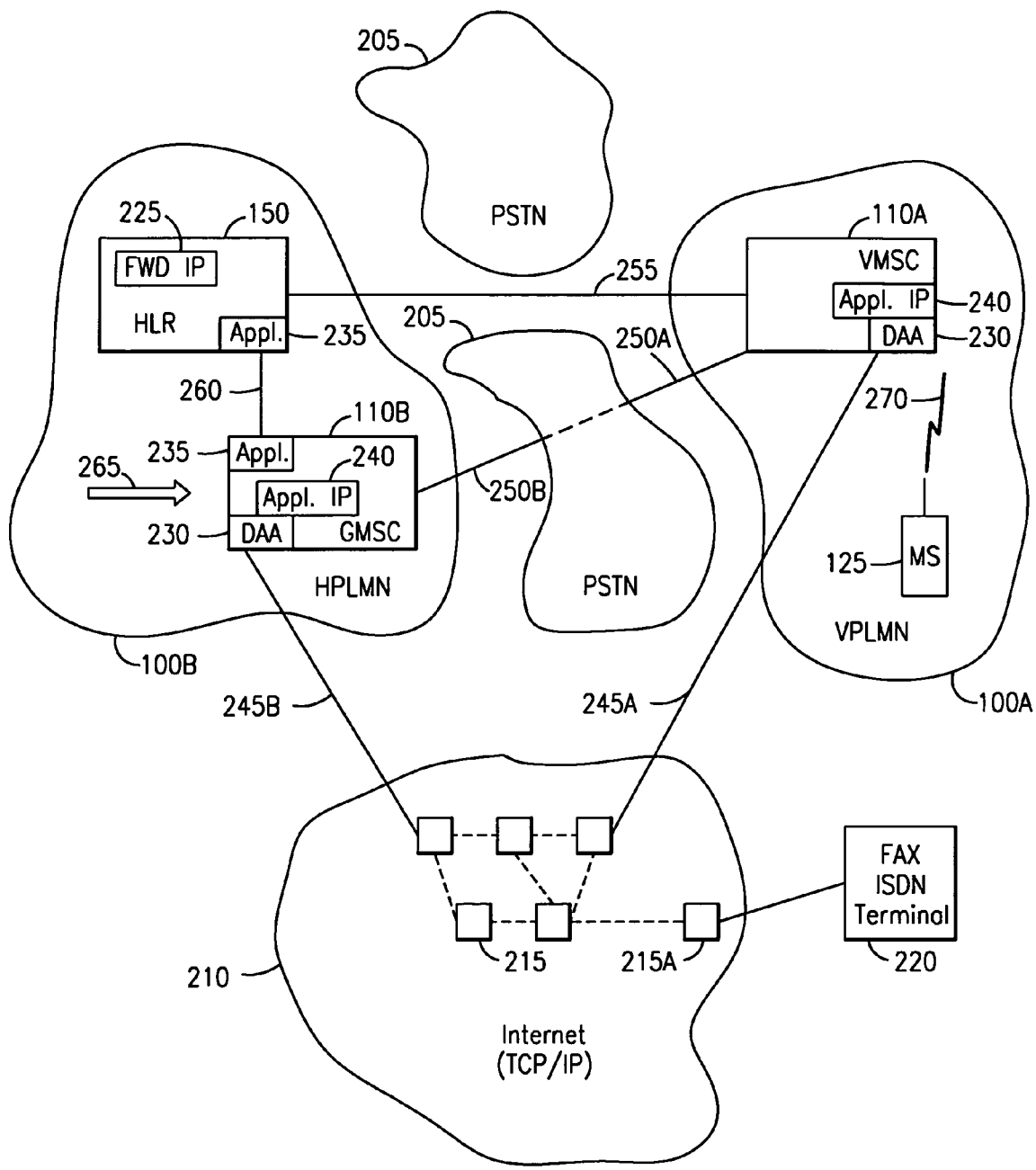
FIG. 2 illustrates an exemplary wireless communications network incorporating Internet call forwarding according to the present invention.

Referring now to FIG. 2, an exemplary wireless communications network incorporating Internet forwarding according to the present invention is illustrated. A Visiting Public Land Mobile Network (VPLMN) 100A and a Home Public Land Mobile Network (HPLMN) 100B are shown. Although the present invention is explained in the context of an inter-PLMN call, it should be understood that the invention is not so limited. With further reference to FIG. 2, two Public Switched Telephone Networks (PSTN) and the Internet are shown, generally designated herein by the reference numerals 205 and 210, respectively. The Internet 210 is a packet-switched network operating under the Transmission Control Protocol/Internet Protocol (TCP/IP) and including a multiplicity of routers 215. It should be understood that the Internet 210 may be any general packet-switched network and the present invention should not be limited to the Internet per se.

The Internet 210 is connected to a terminal 220 by a given router 215A. The terminal 220 may be any electronic device in communication with the Internet 210. For example, terminal 220 may be a fax machine, an Integrated Services Digital Network (ISDN) device, or a general purpose computer. It should be understood that in addition to wireline, the connection from the Internet 210 to the terminal 220 may also be wireless, at least in part. The Internet 210 is in communication with the VPLMN 100A via a connection 245A. Specifically, connection 245A terminates (or originates depending on the communication) at a Visiting Mobile Services Switching Center (VMSC) 110A.

Figure 1:
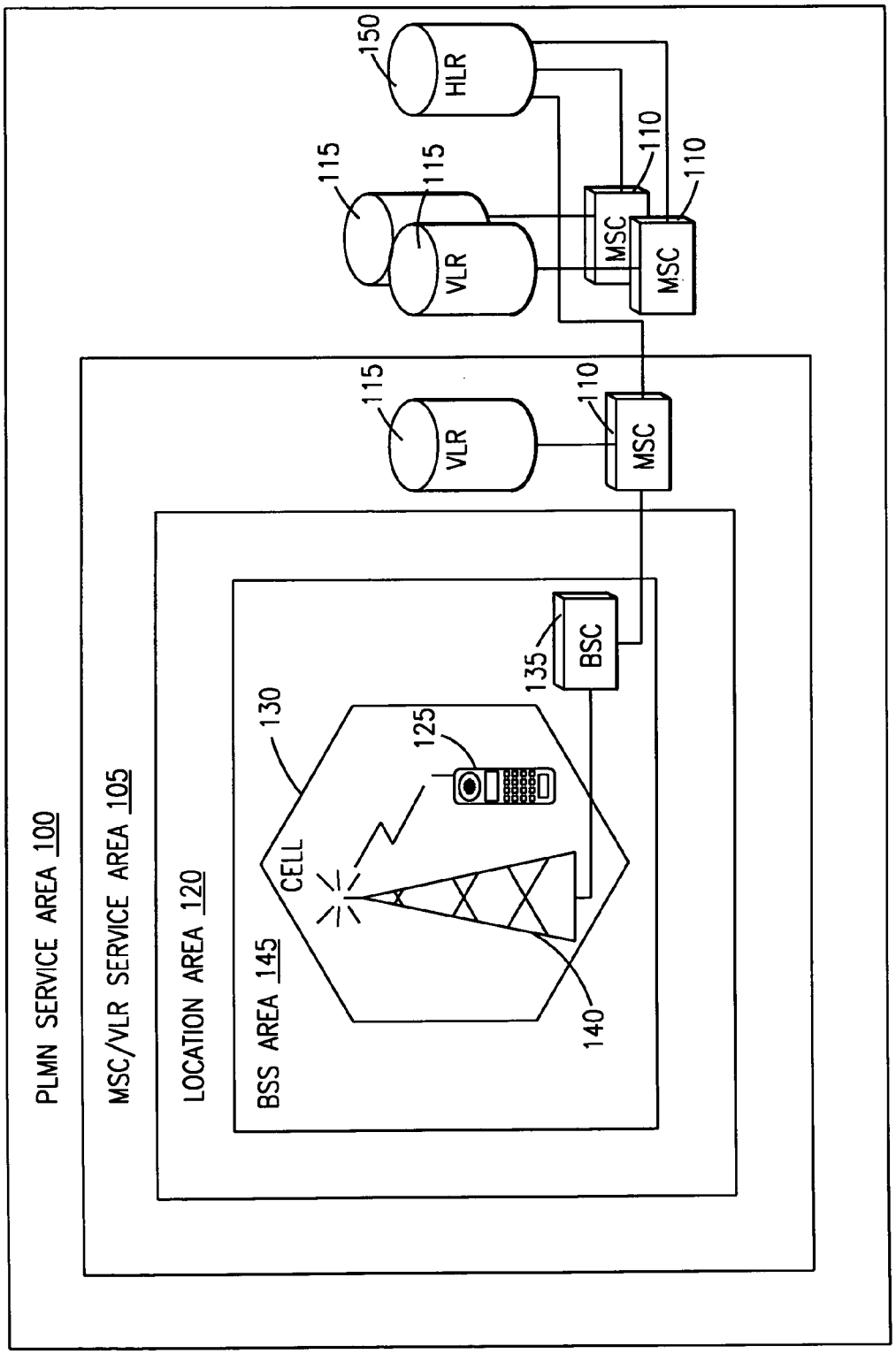
FIG. 1 illustrates an exemplary cellular wireless network in which the present invention may be practiced.

The VMSC 110A includes a Direct Access Application (DAA) 230 that enables the VMSC 110A to interact with a TCP/IP network, such as the Internet 210, as is understood in the art. The DAA 230 may include provisions for adhering to the H.323 protocol for signaling. The H.323 protocol is used, for example, for setting up calls (e.g., telephony calls) through a packet network. The VMSC 110A is also able to receive wireless transmissions via a wireless link 270 directly (or indirectly from a particular BSS area 145 as shown in FIG. 1) from a particular Mobile Station (MS) 125 within the VPLMN 100A. It should be understood that the MS 125 may be any type of mobile terminal, as discussed hereinbefore. For example, the MS 125 may be a mobile phone, a pager, a personal digital assistant (PDA), or a computer with a wireless link.

The VMSC 110A further includes an Application-IP, generally designated by the reference numeral 240 in FIG. 2, for establishing and discontinuing (e.g., general handling) of the Internet forwarding of the present invention in conjunction with the DAA 230. The VMSC 110A is connected directly (although not necessarily so) to a Home Location Register (HLR) 150 within the HPLMN 100B along a connection 255. The VMSC 110A is also connected to a Gateway Mobile Services Switching Center (GMSC) 110B via a first connection 250A, another PSTN 205, and a second connection 250B.

As illustrated in FIG. 2, the HLR 150 and the GMSC 110B are part of the Home Public Land Mobile Network 100B. The MS 125A, which is a visitor to the VPLMN 100A, is registered in the HLR 150 within the HPLMN 100B. The HLR 150 of or corresponding to the MS 125 includes Internet Forwarding Functionality (FWD IP) 225, discussed further herein, such that when the FWD IP 225 is activated by the MS 125, the HLR 150 has a record of such activation. The FWD IP 225 includes, for example, an Internet Protocol (IP) address to which incoming information should be forwarded. Other features and corresponding requirements for the FWD IP 225 will be explained in greater detail hereinbelow. The HLR 150 further includes a communications Application 235 that provides communication over a connection 260 to the corresponding communications Application 235 in the GMSC 110B.

The GMSC 110B may acquire the specifics of the features activated in the FWD IP 225 for the MS 125 by using the communications Application 235 and the connection 260 to access the HLR 150. The GMSC 110B may alternatively receive forwarding instructions from the HLR 150 without receiving any details regarding the Internet call forwarding (ICF) features activated by the MS 125. The GMSC 110B also includes a respective Application-IP 240 to facilitate the Internet call forwarding of the present invention in conjunction with another DAA 230. The DAA 230 of the GMSC 110B provides a TCP/IP and/or User Datagram Protocol (UDP)/IP interface for communicating with the Internet 210 via connection 245B. An incoming call, designated generally by the reference numeral 265, is shown entering the wireless communications network at the GMSC 110B.

Figure 3:
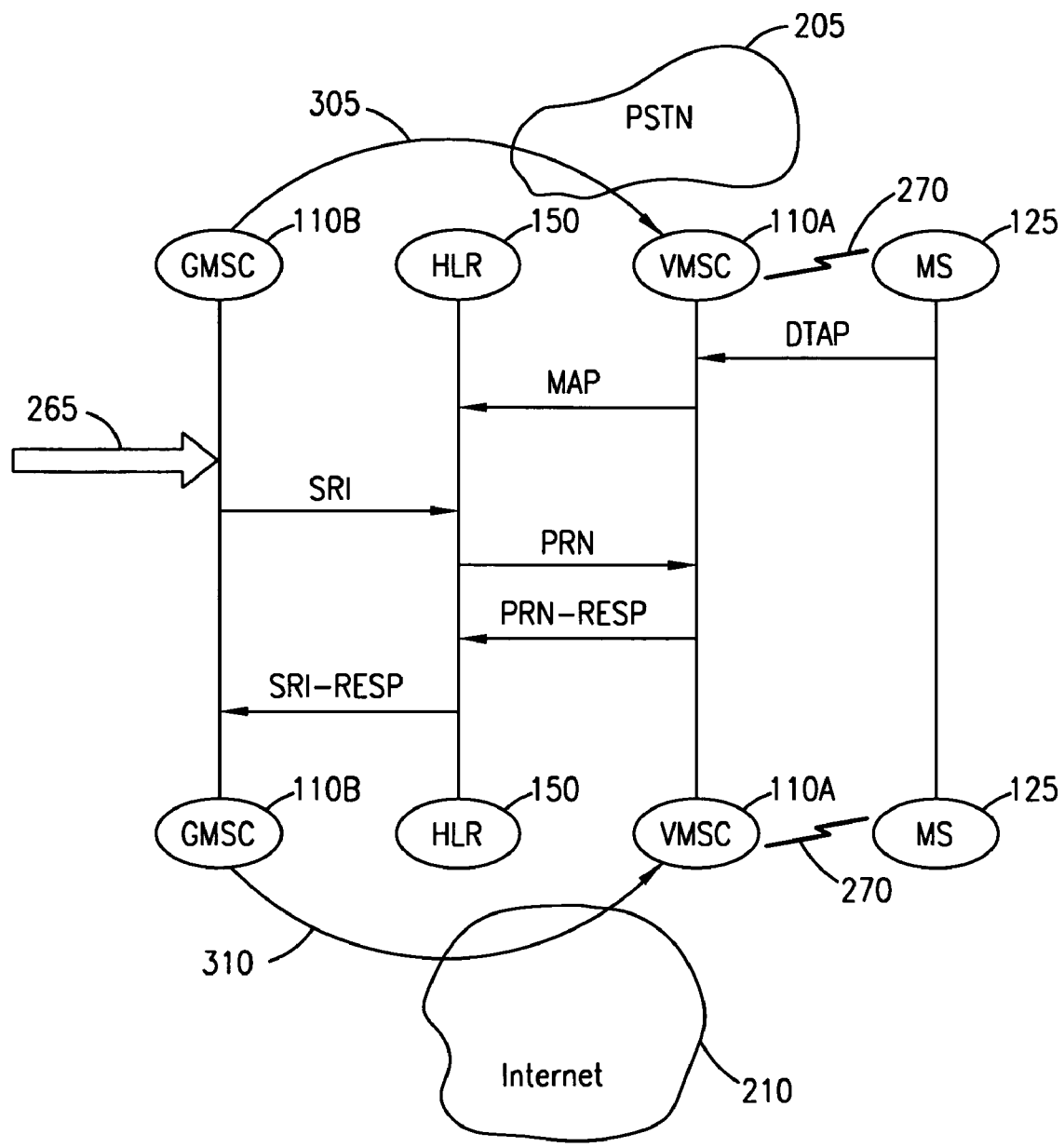
FIG. 3 illustrates a sequence diagram of transmissions in the exemplary wireless communications network of FIG. 2 according to a first embodiment of the present invention.

Referring now to FIG. 3, a sequence diagram of transmissions in the exemplary wireless communications network of FIG. 2 is illustrated according to a first preferred embodiment of the present invention. Several parts of the wireless communications network of FIG. 2 are included in FIG. 3, i.e., the GMSC 110B, the HLR 150, the VMSC 110A, the MS 125, the PSTN 205, and the Internet 210 are all also shown in the sequence diagram of FIG. 3. Additionally, incoming call 265 is shown entering the wireless communications network at the GMSC 110B.

Before activation of an Internet call forwarding ability (e.g., an Internet call forwarding (ICF) Supplementary Service (SS) in a GSM network), incoming call 265 is routed from the GMSC 110B through the circuit-switched PSTN 205 (as represented by path arrow 305) via connections 250B and 250A (of FIG. 2). After activation of an Internet call forwarding ability, on the other hand, incoming call 265 is instead routed from the GMSC 110B through the packet-switched Internet 210 (as represented by path arrow 310) via connections 245B and 245A (of FIG. 2). After the information from the incoming call 265 has reached the VMSC 110A (by either path 305 or 310), the information is preferably transmitted from the VMSC 110A to the MS 125 via the wireless link 270.

It should be understood that the term "information" in this application refers to fax information, data information, and/or voice information calls, etc. It should also be understood that although the method and system of the present invention will be described in the context of a GSM system, the present invention is not so limited. The Internet call forwarding may be utilized generally in any wireless communications network by one of ordinary skill after reading and understanding the principles of the present invention.

The subscriber (not pictured) associated with MS 125 may engage the ICF of the present invention (which is preferably a Supplementary Service (SS) of the wireless communications network) from the MS 125 itself. Alternatively, the subscriber may be able to contact the relevant wireless services provider over the wireline phone system or by a computer (such as the terminal 220) over the Internet 210 to activate the ICF SS. When the ICF is activated from the MS 125, the Direct Transfer Application (DTAP) facility is preferably employed.

The DTAP facility includes the following four messages pertaining to supplementary services: (1) Register SS, (2) Erase SS, (3) Activate SS, and (4) Deactivate SS. In the DTAP message of FIG. 3, the MS 125 is activating the ICF SS over the wireless link 270. Many alternative features for the ICF SS of the present invention are contemplated. One preferred embodiment forwards data or fax calls only (but all of the time) through the Internet 210 to the VMSC 110A. The VMSC 110A then transmits the data or fax information to the MS 125 via the wireless link 270. Alternative embodiments will be described more fully hereinbelow.

To fully activate the ICF SS, the VMSC 110A preferably transmits a Mobile Application Part (MAP)-based message to the HLR 150 over the connection 255, as illustrated in FIG. 2. The MAP message may include an IP address, and if so, an indication that an IP address populates the address field. The HLR 150 may then store in memory the activation of the ICF SS in the FWD IP 225. The FWD IP 225 also includes relevant specifics regarding the ICF SS feature(s) activated. In this example, such specifics include that fax and data calls only (but all of the time) are to be forwarded through the Internet 210. It should be understood, however, that fax and data (either together or individually) may also be selectively forwarded according to the principles of the present invention.

When the GMSC 110B receives the incoming call 265 (which incoming call is affiliated with the MS 125 and/or the subscriber corresponding thereto), the GMSC 110B transmits a Send Routing Information (SRI) message to the HLR 150 via connection 260. The HLR 150 transmits a Provide Roaming Number (PRN) message to the MSC 110 to which the MS 125 is currently associated (VMSC 110A in this example) via connection 255. It should be noted that no PRN message (or response thereto) need be sent if the forwarding service is unconditional. The VMSC 110A responds to the inquiry by transmitting a PRN-Response (PRN-RESP) message via connection 255 to the inquiring HLR 150.

It should be understood that contacting the VMSC 110A in all circumstances is not required; in other words, the HLR 150 may act alone. For example, the HLR 150 may take action by itself when the ICF is unconditional. After the HLR 150 receives the PRN-RESP message from the VMSC 110A, the HLR 150 may then respond to the GMSC 110B by transmitting an SRI-RESP message via connection 260.

In a preferred embodiment, only the two responses (the PRN-RESP and SRI-RESP) need be modified to implement the method and system of the present invention. Specifically, in this exemplary embodiment, the response from the HLR 150 adds an indication that the call should be sent over another network (e.g., the Internet) and an address to use (e.g., an IP address).

The GMSC 110B, based on instructions from the HLR 150, forwards the incoming fax or data call (incoming call 265 being fax or data in this example) through the Internet 210 to the VMSC 110A. Because the packet-switched Internet 210 is significantly cheaper than the circuit-switched PSTN 205, the subscriber corresponding to the MS 125 or another destination such as an H.323 terminal can save communications costs (e.g., the relevant service provider may charge the subscriber less). The subscriber corresponding to the MS 125 may cancel the ICF SS by transmitting a DTAP Deactivate SS message via the wireless link 270. It should be noted that other messaging/command schemes (other than DTAP/MAP) may be used to implement the present invention.

Figure 4:
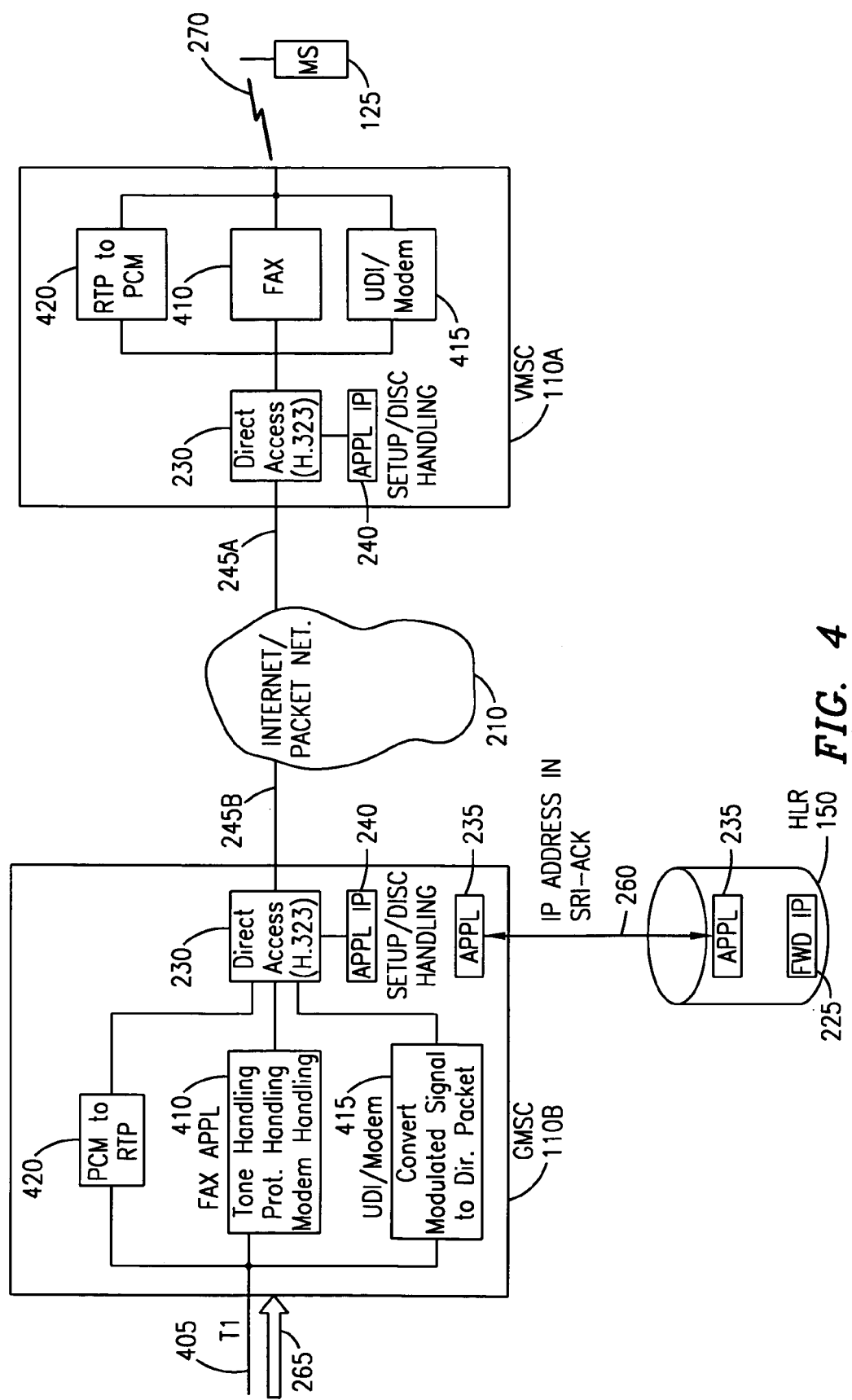
FIG. 4 illustrates additional aspects of incorporating Internet call forwarding into a wireless communications network according to the first embodiment of the present invention.

Referring now to FIG. 4, additional aspects of incorporating Internet call forwarding into a wireless communications network according to the first embodiment of the present invention are illustrated. The incoming call 265 is shown arriving at the GMSC 110B via a conventional T1 connection 405. In addition to the DAA 230 and the Application-IP 240, both the GMSC 110B the VMSC 110A further include a Fax Application 410, an Unrestricted Digital Information (UDI) Application/Modem 415, and a Pulse Code Modulation (PCM) to Real Time Protocol (RTP) (or RTP to PCM) Application 420. Though these elements (and the Application 235) are termed "applications", it should be understood that they can alternatively be any programming, code, hardware, software, firmware, etc. that can achieve the described functionality.

The Fax Application 410 is configured so as to be capable of providing the proper interface, e.g., tone handling, protocol handling, modem handling, etc. The UDI Application/Modem 415 is configured so as to be capable of converting modulated signals to digital signals/packets and vice versa. The RTP to PCM (or PCM to RTP) Application 420 is configured so as to convert from the RTP of the Internet to the PCM of the telephone network (or vice versa). Each application aids in providing a transition between a standard telecommunications network and the Internet 210.

The GMSC 110B, along with the HLR 150, also includes the Application 235. The Applications 235 enable the GMSC 110B to acquire details regarding an established ICF SS for the MS 125 from the FWD IP 225. For example, the Internet call forwarding of the present invention alternatively permits information (e.g., fax and data only) to be forwarded to an IP address such as the IP address associated with the terminal 220. The designated IP address in FWD IP 225 can be transmitted from the HLR 150 via the connection 260 by virtue of the Applications 235. For example, an SRI-Acknowledge (ACK) message transmitted from the HLR 150 to the GMSC 110B can contain the designated IP address.

Figure 5A:
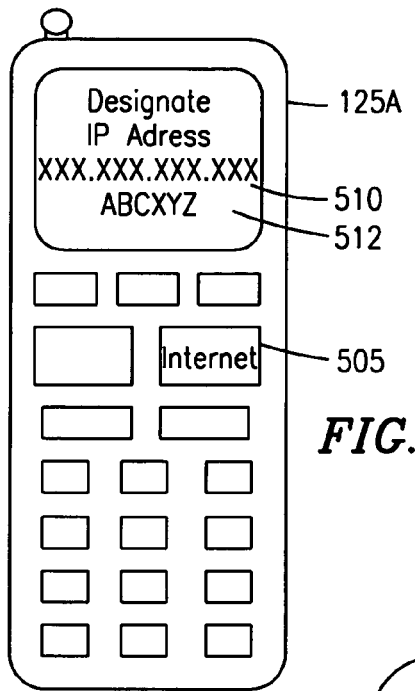
FIG. 5A illustrates an exemplary mobile station according to the first embodiment of the present invention.

Referring now to FIG. 5A, an exemplary mobile station 125A according to the first embodiment of the present invention is illustrated. The designated IP address is preferably provided by the subscriber associated with the MS 125. (Alternatively, the designated IP address may be provided otherwise, such as by the computer terminal linked directly to the Internet 210, as noted hereinabove.) The MS 125A includes an Internet call forwarding key (or button) 505 that can begin the establishment procedure or be programmed so as to activate the Internet call forwarding of the present invention at the touch of a single key 505.

When the Internet key 505 of the MS 125A begins the establishment procedure, one of the steps may include the inputting of an IP address. An IP address 510 (under current protocols and standards) adheres to the following form: "XXX.XXX.XXX.XXX". Each "X" represents one numerical digit. It should be noted that the addressing scheme of other packet-switched networks or future IP addressing schemes can alternatively be used. The IP address 510 input by the subscriber is the designated IP address. The IP address input by the subscriber may alternatively be in a more user-friendly format such as a Uniform Resource Locator (URL), an e-mail address, or another option such as an alias established for this purpose. This alternative is represented by the "ABCXYZ" 512 element on the screen of the MS 125A. The designated IP address represents the designation for information that is to be forwarded over the Internet 210. Such a designated IP address may correspond to a given terminal 220 (e.g., a fax machine, a computer, or an H.323 terminal) or to the MS 125.

Thus, after implementing the method and system of the present invention, the MS 125 may have an IP address as well as a standard telephony address (e.g., an E.164 address, which adheres to the following form: "XXX-XXX-XXXX", in which each "X" represents a single numerical digit). Therefore, the MS 125 can preferably be addressed through both a standard telephony address and an IP address. Furthermore, the MS 125 preferably incorporates IP address handling into the programming and circuitry controlling it.

Even if the MS 125 does not have an IP address associated with it, the MS 125 can still preferably operate with/on IP addresses, e.g., it can supply an IP address in an ICF message. A subscriber associated with MS 125 can preferably enter IP addresses in multiple manners. Actually entering the 12-digit number (with or without manually entering the three "dots") is one example. Alternatively, the subscriber can preferably choose to enter the designated IP address in text form (e.g., a URL). Also, the subscriber preferably has the option to direct incoming information to an e-mail address (which also may be entered in textual form).

Figure 5B:
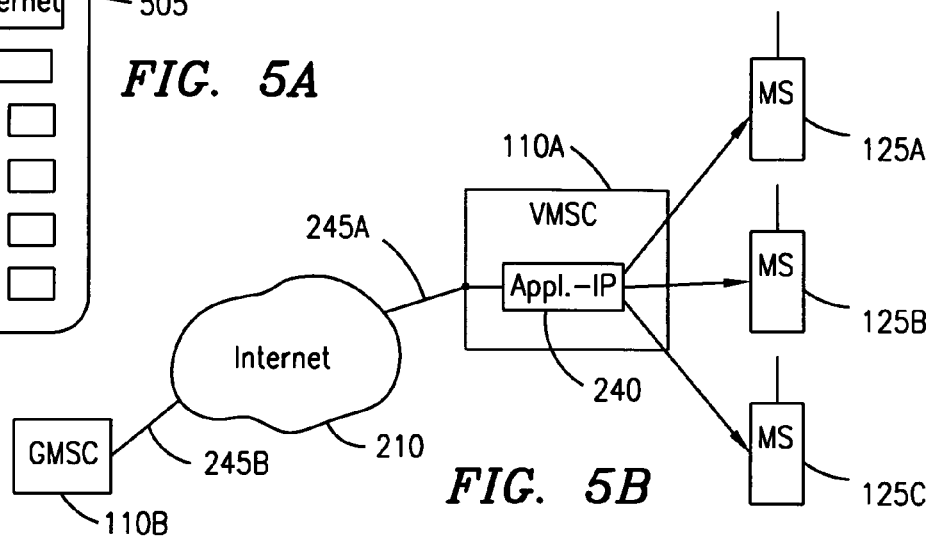
FIG. 5B illustrates an alternative IP addressing scheme in operation.

Referring now to FIG. 5B, an alternative IP addressing scheme in operation is illustrated. In this alternative, a subscriber may have activated an ICF SS. In this example, incoming fax and data are to be routed over the less-costly packet-switched network, the Internet 210, from the GMSC 110B to the VMSC 110A, which is serving the MS of the relevant subscriber. The IP address used for this ICF SS is associated with the VMSC 110A. Thus, the incoming fax and data are routed over the Internet 210 to the designated IP address destination of the VMSC 110A. The VMSC 110A may then distribute the fax and data streams to, for example, the target MS (e.g., MS 125A, 125B, or 125C) via the wireless links of the wireless network. The distribution may be determined by the phone numbers of the target MSs. The Application-IP 240 (or other application or database) contains the requisite programming and information to properly forward the incoming fax and data. The GMSC 110B may receive the IP address of the VMSC 110A from the VMSC 110A or from the MS (e.g., in a separate transaction).

Figure 5C:
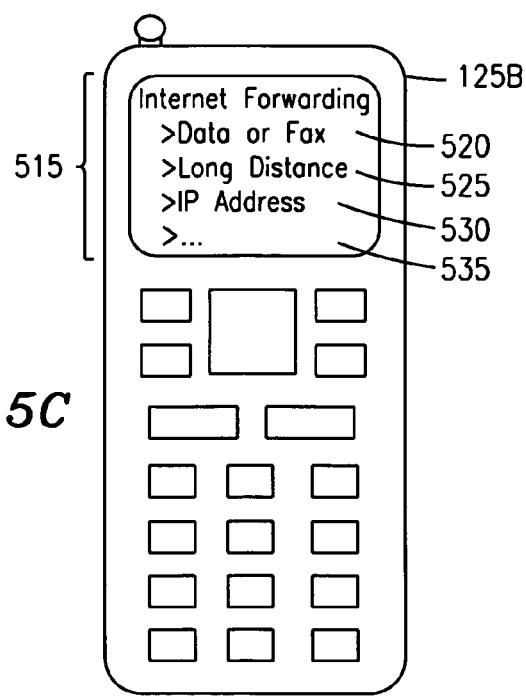
FIG. 5C illustrates another exemplary mobile station according to the first embodiment of the present invention.

Referring now to FIG. 5C, another exemplary mobile station 125B according to the first embodiment of the present invention is illustrated. MS 125B enables the subscriber to establish an Internet call forwarding option in menu format. An exemplary "Internet Forwarding" menu 515 is illustrated. As explained generally hereinabove, the subscriber may enter a designated IP address. With MS 125B, the subscriber may enter an IP address after selecting the "IP Address" menu entry 530. It should be understood that the "Internet Forwarding" menu 515 may include several (e.g., hierarchical) layers for each menu entry. For example, the "IP Address" menu entry 530 may, when selected, provide multiple menu entry options such as entering an e-mail address, URL, numerical IP address, etc. It should be noted that other menu formats are within the spirit and scope of the present invention.

Some of the other available options for the subscriber are: "Data or Fax" menu entry 520 and "Long Distance" menu entry 525. An unspecified (" . . . ") menu entry 535 is also illustrated to reinforce that the exemplary menu entries are not exhaustive. The "Data or Fax" menu entry 520 preferably enables the subscriber to specify that only data or fax types of information (e.g., not voice calls) are to be forwarded through the Internet 210. As another alternative, the subscriber (through menu entry 520 or otherwise), may specify that all fax and data calls are to be forwarded over the Internet 210 to an Internet destination such as terminal 220. The "Long Distance" menu entry 525 may enable the subscriber to specify that only calls that are long distance (e.g., that would otherwise incur toll charges) are to be forwarded over/through the Internet 210. As one possible additional alternative, another menu option can enable the subscriber to activate ICF for fax and data calls that are also long distance. It should be noted that those of ordinary skill will be able to devise other strategies, techniques, and interfaces for permitting a subscriber to activate Internet call forwarding after reading and understanding the principles of the present invention.

Another possible ICF feature is that the criterion for utilizing the Internet 210 can be based on whether the incoming call 265 is international. If the incoming call 265 is international, then it can be routed through the Internet 210 to avoid international charges. This can be achieved, for example, by comparing the country codes of the called and calling parties.

The MS 125 can include a myriad of abilities, indicators, and options to further refine the ICF SS. For example, the MS 125 may include an indication that the subscriber has information waiting at a designated IP address destination. An indication can be included that denotes that calls are being forwarded over/through the Internet 210, along with indications connoting which ICF features are activated. Furthermore, the MS 125 can also include programming and/or circuitry that conducts a format check when an IP address (numerical or textual or an e-mail address) is entered. The MS 125, in conjunction with the associated VMSC 110A, can verify that an entered IP address exists on the Internet 210. Consequently, the MS 125 can include an illegal IP address indicator for either or both situations.

Figure 6:
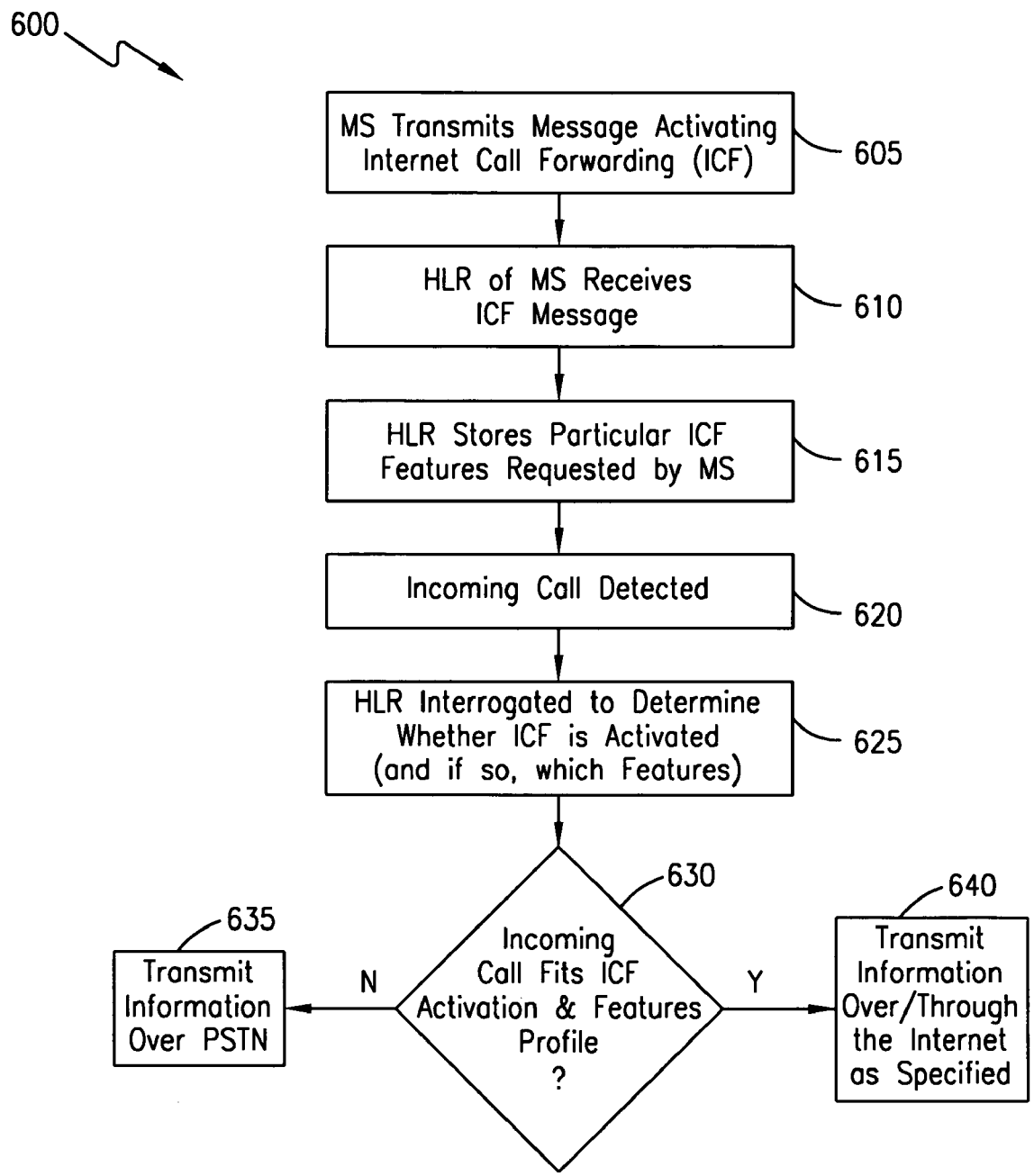
FIG. 6 illustrates a method in flowchart form for implementing Internet call forwarding in a wireless communications network according to the first embodiment of the present invention.

Referring now to FIG. 6, a method in flowchart form for implementing Internet call forwarding in a wireless communications network according to the first embodiment of the present invention is illustrated. Flowchart 600 begins with the MS 125 transmitting a message activating Internet call forwarding (ICF) (step 605). This ICF message includes specifics regarding any special features that the subscriber is activating. These specifics may include a designated IP address (e.g., such as IP address 510) and a toll-calling-only request. As an alternative embodiment, the VMSC 110A can verify, when a visiting MS 125 requests to activate an ICF SS, that the VMSC 110A has either a direct Internet 210 connection or a T1 line (in which the T1 line is a PSTN connection, and preferably local) to an MSC 110 that does have a direct Internet 210 connection. If neither option is available, then the VMSC 110A can so notify the MS 125 or merely refuse to permit call routing through the Internet 210 and thence to the VMSC 110A (i.e., call routing over the Internet 210 to an Internet destination such as the terminal 220 is still desirable and permitted).

Continuing with the description of flowchart 600, the HLR 150 corresponding to the MS 125 receives the ICF message (step 610). The ICF message may have been transmitted over a Signaling System No. 7 (SS7) network, the Internet (in accordance with another embodiment described hereinbelow) etc. The HLR 150 processes the ICF message by storing the particular ICF features requested by the MS 125 as part of the FWD IP 225.

Once an incoming call 265 is detected by the GMSC 110B (step 620), the HLR 150 is interrogated to determine whether the ICF SS is activated (step 625). Additionally, a determination is made regarding which, if any, special ICF SS features are activated (also step 625). These determinations (of step 625) are effected by analyzing the FWD IP 225 profile for the called party, which is MS 125 in this example. A branching determination is made (e.g., by the HLR 150 or by the GMSC 110B after the HLR 150 has provided the FWD IP 225 profile) to determine whether the incoming call 265 fits the profiled features (and that the ICF SS is activated) (step 630).

The results are transmitted by Applications 235 over connection 260 to the GMSC 110B. Either the profile or the final result (of step 630) or some intermediate product thereof is transmitted to GMSC 110B from the HLR 150; in other words, either the GMSC 110B or the HLR 150 may be responsible for the determinations (of steps 625 and 630). Regardless, any such locus for the determinations is embraced by the present invention.

For this example, the subscriber associated with the MS 125 has activated ICF, but only for fax/data calls. If the information in the incoming call 265 is a voice call, then the (voice call) information is transmitted over the PSTN 205 (e.g., a circuit connection is setup over the PSTN 205 from the GMSC 110B to the VMSC 110A) (step 635). If, on the other hand, the information in the incoming call 265 is fax or data, then the (fax or data) information is transmitted over/through the Internet 210 (step 640).

In a modification of the immediately preceding example, if the MS 125 has additionally established (as an optional feature) a designated IP address destination for such calls, then the fax/data information will be transmitted from the GMSC 110B to the Internet 210 via the connection 245B and then over the Internet 210 to an IP address destination such as terminal 220. If the MS 125 has not established a designated IP address destination (or the designated IP address destination corresponds to the MS 125), then the fax/data information will be transmitted through the Internet 210 and onward to the VMSC 110A via the connection 245A. The DAA 230, in conjunction with the Application-IP 240, will then reformat the TCP/IP and/or UDP/IP and/or RTP packets into another format, depending on the air interface specification for the wireless communications network, which is GSM in these examples.

In another example, the subscriber has two phone numbers (one for fax calls) and has activated the ICF SS for fax calls. When the HLR 150 is performing the determinations (of steps 625–630), the HLR 150 will be able to determine that the incoming call 265 is a fax call when the B-number is to the fax phone number of the subscriber. Assuming that the incoming call 265 is to the fax number in this example, then the HLR 150 will pass the designated IP address to the GMSC 110B via the connection 260. Alternatively, if the subscriber only has one E.164 number, the Bearer Capabilities of the ISDN Signaling User Part (ISUP) message of the incoming call 265 may indicate that the incoming call 265 is a fax call.

In another embodiment of the Internet forwarding of the present invention, and with reference again to FIG. 2, ISUP messaging may be transmitted over the Internet 210 instead of an SS7 data network (such as represented in this example by connections 250A, 250B, and 255). For example, an Initial Address Message (IAM) may be transmitted over the Internet 210 when performing a call setup procedure for a circuit switched call through a PSTN 205. This can reduce the costs of operating a telecommunication network inasmuch as it is (or becomes) cheaper (e.g., per byte of information) to transmit information over the Internet 210 as compared to an SS7 network. Furthermore, the information transmitted in the sequence diagram of FIG. 2 (other than the DTAP message) may also be transmitted over the Internet 210. The Application-IP 240 of both the GMSC 110B and the VMSC 110A may receive the IAM that is transmitted over the Internet 240 and then setup a channel from the GMSC 110B to the MS 125.

Although preferred embodiments of the method and system of the present invention have been illustrated in the accompanying Drawings and described in the foregoing Detailed Description, it will be understood that the present invention is not limited to the embodiments disclosed, but is capable of numerous rearrangements, modifications and substitutions without departing from the spirit of the invention as set forth and defined by the following claims.

What is claimed is:

1. In a telecommunications system, a method for selectively forwarding incoming messages to a subscriber over a packet-switched network, said method comprising the steps of:
    establishing, responsive at least partially to at least one input of said subscriber, a call forwarding parameter that indicates that messages of one or more predetermined information type parameters are to be forwarded over said packet-switched network;
    receiving an incoming message for said subscriber, said incoming message for said subscriber having an information type parameter associated therewith;
    determining whether said information type parameter comports with said call forwarding parameter; and
    if so, routing said incoming message over said packet-switched network.

2. The method according to claim 1, wherein said step of establishing further comprises the steps of:
    transmitting, by said subscriber, a call forwarding activation request to a home location register; and
    storing, pursuant to said call forwarding activation request, said call forwarding parameter within said home location register.

3. The method according to claim 1, wherein said packet-switched network is the Internet.

4. The method according to claim 1, wherein said step of routing further comprises the step of routing said incoming message over said packet-switched network to an address destination on said packet-switched network.

5. The method according to claim 1, wherein said step of routing further comprises the step of routing said incoming message through said packet-switched network and then back to said telecommunications system.

6. The method according to claim 1, wherein said call forwarding parameter comprises an indication that call forwarding is activated for data and fax information.

7. The method according to claim 1, wherein said call forwarding parameter comprises an indication that call forwarding is activated for incoming calls that would incur toll charges.

8. The method according to claim 1, wherein said incoming message includes a designated packet-switched network address destination.

9. A telecommunications system for selectively forwarding an incoming message having an information type parameter for a subscriber over a packet-switched network, said system comprising:
    a home location register, said home location resister associated with said subscriber;
    a home database, said home database associated with said home location register, said home database for storing therein a call forwarding profile for said subscriber, said call forwarding profile containing therein at least one call forwarding parameter, said at least one call forwarding parameter established by said subscriber to indicate that messages having one or more predetermined information type parameters are to be forwarded over said packet-switched network; and
    routing means for routing said incoming message at least one of over and through said packet-switched network for said subscriber if said information type parameter corresponds to at least one of said one or more predetermined information type parameters.

10. The telecommunications system according to claim 9, further comprising:
    a mobile terminal for transmitting by said subscriber a call forwarding activation request to said home location register, said call forwarding activation request updating said call forwarding profile of said subscriber within said home database.

11. The telecommunications system according to claim 10, wherein said packet-switched network is the Internet.

12. The telecommunications system according to claim 11, wherein said call forwarding activation request includes an Internet protocol address destination.

13. The telecommunications system according to claim 12, wherein said Internet protocol address destination is associated with a terminal connected to the Internet.

14. The telecommunications system according to claim 12, wherein said Internet protocol address destination is associated with said mobile terminal.

15. The telecommunications system according to claim 10, wherein said call forwarding activation request includes a provision to forward via said packet-switched network incoming calls comprised of at least one of fax and data information.

16. The telecommunications system according to claim 10, wherein said call forwarding activation request includes a provision to forward via said packet-switched network incoming calls which would incur toll charges.

17. The telecommunications system according to claim 10, wherein said subscriber inputs a designated Internet protocol address destination to said mobile terminal.

18. The telecommunications system according to claim 17, wherein said mobile terminal checks said designated Internet protocol address destination.

19. The telecommunications system according to claim 17, wherein said mobile terminal, in conjunction with a mobile switching center, verifies the existence of said designated Internet protocol address destination.

20. The telecommunications system according to claim 10, wherein said call forwarding activation request is transmitted to said home database via said packet-switched network.

21. A mobile terminal, associated with a subscriber, for selectively indicating the forwarding of an incoming message thereto over a packet-switched network, said mobile terminal comprising:
- input means for inputting, by said subscriber, a call forwarding activation request, said call forwarding activation request stipulating that incoming messages of one or more predetermined information type parameters are to be forwarded at least one of over and through said packet-switched network; and
- transmission means for transmitting said call forwarding activation request, whereby said incoming message is forwarded for said subscriber, pursuant to said call forwarding activation request if an associated information type parameter of said incoming message corresponds to at least one of said one or more predetermined information type parameters, at least one of over and through said packet-switched network.

22. The mobile terminal according to claim 21, wherein said input means further comprises a key means for inputting said call forwarding activation request by pressing a single key.

23. The mobile terminal according to claim 21, wherein said input means further comprises a menu means for inputting said call forwarding activation request.

24. The mobile terminal according to claim 21, wherein said packet-switched network is the Internet and said call forwarding activation request comprises an Internet protocol address.

25. The mobile terminal of claim 24, wherein said input means further comprises format checking means for checking whether a respective inputted Internet protocol address is in a proper format.

26. The mobile terminal of claim 21, wherein said call forwarding activation request is selected from the group comprising (i) fax and data only Internet call forwarding, (ii) long distance only Internet call forwarding, (iii) e-mail Internet protocol address call forwarding, and (iv) combinations of (i), (ii), and/or (iii).

27. The mobile terminal of claim 21, further comprising Internet call forwarding indicator means for providing an indication to said subscriber that Internet call forwarding is activated.

* * * * *